United States Patent
Derie et al.

(10) Patent No.: US 7,344,489 B2
(45) Date of Patent: Mar. 18, 2008

(54) SLUDGE TREATMENT METHOD

(76) Inventors: Rene Derie, Avenue Wiener, 6, Bruxelles (BE) 1170; Guy Depelsenaire, Avenue des Combattants, 28, Court-Saint-Etienne (BE) 1490; Ange Nzihou, 192, rue du Roc, Albi (FR) 81000

( * ) Notice: Subject to any disclaimer, the term of this patent is extended or adjusted under 35 U.S.C. 154(b) by 0 days.

(21) Appl. No.: 10/531,454

(22) PCT Filed: Oct. 16, 2003

(86) PCT No.: PCT/EP03/11671

§ 371 (c)(1), (2), (4) Date: Apr. 14, 2005

(87) PCT Pub. No.: WO2004/035490

PCT Pub. Date: Apr. 29, 2004

(65) Prior Publication Data

US 2005/0258105 A1 Nov. 24, 2005

(30) Foreign Application Priority Data

Oct. 16, 2002 (FR) .................................. 02 12952

(51) Int. Cl.
B09C 1/00 (2006.01)
(52) U.S. Cl. .................................................... 588/256
(58) Field of Classification Search ................ 588/412, 588/315, 256
See application file for complete search history.

(56) References Cited

U.S. PATENT DOCUMENTS

| 3,363,758 | A | | 1/1968 | Cronberg et al. |
| 3,397,140 | A | | 8/1968 | Dea |
| 5,281,339 | A | * | 1/1994 | Mainwaring et al. ....... 210/705 |
| 5,536,899 | A | * | 7/1996 | Forrester ..................... 588/315 |
| 5,860,908 | A | * | 1/1999 | Forrester ..................... 588/256 |
| 6,132,355 | A | * | 10/2000 | Derie ......................... 588/257 |
| 2004/0112842 | A1 | | 6/2004 | Depelsenaire et al. |
| 2005/0033105 | A1 | | 2/2005 | Depelsenaire |
| 2005/0258105 | A1 | | 11/2005 | Derie et al. |

FOREIGN PATENT DOCUMENTS

| AU | 31688 89 | | 9/1989 |
| DE | 27 38 803 | | 3/1979 |
| FR | 2 739 039 | | 3/1997 |
| FR | 2 815 338 | | 4/2002 |
| JP | 60-51681 | | 3/1985 |
| JP | 60 225700 | | 11/1985 |
| JP | 05317894 A | * | 12/1993 |
| JP | 2000 296389 | | 10/2000 |
| RU | 2 051 123 | | 12/1995 |

OTHER PUBLICATIONS

U.S. Appl. No. 11/578,147, filed Oct. 10, 2006, Depelsenaire.

* cited by examiner

*Primary Examiner*—John Kreck
(74) *Attorney, Agent, or Firm*—Oblon, Spivak, McClelland, Maier & Neustadt, P.C.

(57) ABSTRACT

Process for the treatment of a sludge containing heavy metals and organic matter according to which foaming of the sludge is brought about and it is dried.

15 Claims, 1 Drawing Sheet

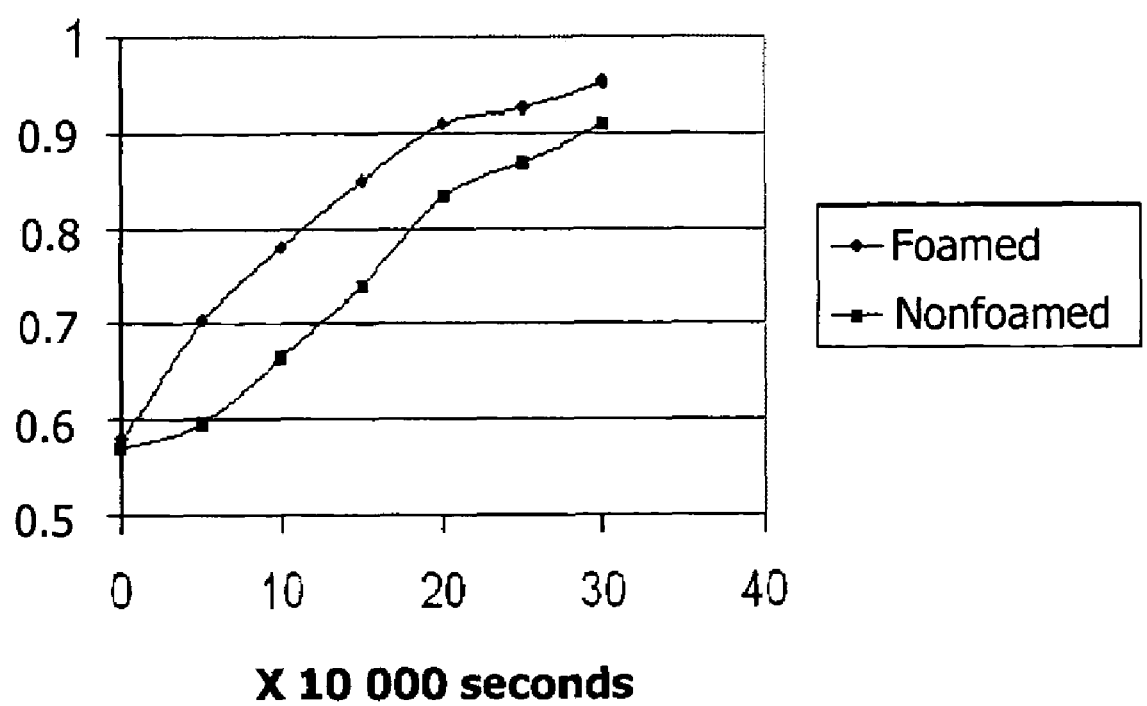

SLUDGE TREATMENT METHOD

The invention relates to a process for the treatment of sludge, in particular contaminated with heavy metals and organic matter, for example that resulting from sediments from the cleaning of waterways or of polluted soils.

The problems posed by the increasingly large quantities of sludge to be discharged, treated and stored are well known. These sludges are of multiple origin. They come for example from water purification plants, from the dredging or cleaning of waterways or from various industries and can contribute to the contamination of soils. The case of sediments from the cleaning of waterways is particularly worrying given the quantities involved and their contamination with pollutants such as heavy metals and organic matter. A large proportion of the waterways in the north of Europe is currently obstructed by sludge which hampers the movement of boats. The direct or indirect economic and environmental consequences thereof are very immense. It is moreover well known that this worrying situation of the waterways is mainly due to the disadvantages of the current solutions for the treatment and storage of contaminated sludge.

Indeed, a convenient means of disposing of sludge consists in discharging it by boat into the sea or in carrying it by means of pipelines to waste disposal sites (settling lagoons). However, when the sludges are contaminated with heavy metals or dangerous organic matter (which is generally the case with sediments from the cleaning of waterways), this means is obviously unacceptable. Before they can be stored, the sludges must indeed be treated in order to satisfy the tests of non toxicity. In this regard, in order to facilitate the handling and storage of the sludges, it is important to be able to dry them effectively and economically.

To treat large quantities of sludge, it is known to mix them with phosphoric acid and to subject the mixture to calcining in order to inert the heavy metals contained in the sludge and to destroy the organic matter (SOLVAY FR 2815338). However, the exploitation of this known process has the disadvantage of being relatively expensive, in particular because of the consumption of energy which it entails in order to dry the sludge during its calcining. Moreover, the liquid state of the phosphated sludge has appeared as a difficulty during certain types of handling.

The invention aims to provide a process for the treatment of sludge which is more economical than the abovementioned known process and which rapidly converts the sludge to products having a sufficient mechanical strength to be handled easily, for example by building site tools (mechanical diggers, bulldozers and the like).

Consequently, the invention relates to a process for the treatment of sludge successively comprising a step of foaming of the sludge under controlled conditions which make it possible to obtain a foam having a density of less than 90% of that of the sludge and a step of drying of the foam.

"Sludge" is intended to mean any aqueous substance containing solid matter in suspension. It may be of natural origin or may result from the addition of water to a pulverulent solid substance obtained for example by grinding. When the sludge is of natural origin, it advantageously contains silt, mud and mineral matter in suspension (sand or even coarse gravel). The sludges obtained from the cleaning of waterways or from polluted soils constitute examples of natural sludges to which the invention applies. Moreover, sludges resulting from the addition of water to incineration ash or to motor vehicle crushing residues are examples of artificial sludges to which the invention applies. The breadth of the particle size distribution of the particles in suspension in the sludge may be very high, for example from less than 1 micron to several hundreds of microns, or even several millimetres. Sludge often contains a high content of very fine particles. Frequently, 10% of the weight of the dry sludge consists of particles having a diameter of less than 5 microns, while the content of particles having a diameter greater than 500 microns may be up to several percent. Moreover, histograms of the particle size of certain sludges have the characteristic feature of being multimodal, that is to say that they have several peaks.

For the process according to the invention, sludges having dry matter contents of less than 70% at the time of foaming are particularly suitable, the dry matter content being defined as the percentage by weight of dry matter contained in the sludge. In this description, the dry matter content of a sample is determined by calculating the ratio between the weight of the sample after and before a residence of 4 hours in an oven kept at 100° C. Dry matter contents of less than 30% or in some cases 40% are preferably to be avoided.

According to the invention, foaming of the sludge is carried out, following which the sludge is in the form of a foam (foam is understood to mean, for a given starting material, a state of this material having a density of less than the starting material). This essential characteristic of the invention makes it possible to facilitate subsequent handling of the sludge. Indeed, the inventors have observed that after a period of storage varying typically from 2 to 7 days, preferably from 4 to 6 days, during which the sludge, initially in the foam state, is allowed to stand at customary external temperatures (but avoiding freezing), its consistency is close to that of a solid substance. At this moment, the sludge can be easily handled by construction site machines such as mechanical diggers or bulldozers while still containing a lot of water (typically up to 40% by weight). Foams of low density appeared to give the best consistencies. The density of the foam must be less than 90% of that of the sludge before treatment. Values of less than 85%, for example of less than 80%, preferably of less than 75%, are advantageous. It is preferred that the density does not fall below 50%. Values of between 55 and 65% are particularly suitable.

The foaming of the sludge may be brought about by any known foaming technique suitable for the sludge to be treated. The foaming may be obtained in particular by the chemical route by the addition of reagents which cause a gaseous emission in situ. In a preferred embodiment, the reaction of an acid such as hydrochloric, sulphuric or phosphoric acid with for example a carbonate is used to obtain the gaseous emission. It is observed that a gaseous emission of $H_2S$ during phosphatization improves the foaming of the sludges. The addition or the presence of surfactants, which stabilize the foam, is also favourable. In this regard, it is observed that a number of humic acids present in the sludges obtained from the cleaning of waterways have a favourable effect on the foaming, probably to their surfactant character. Depending on the sludge treated, it will be appropriate optionally to add a number of surfactants in order to obtain a foam having a density in accordance with the invention. The selection of the most appropriate surfactant and of the quantity to be used will be carried out on a case by case basis, in a manner known per se. Moreover, it is preferable that the sludge is subjected to mechanical stirring in order to facilitate the foaming. The intensity of the stirring is chosen according to the specific conditions for using the process according to the invention. It is advantageous for the mechanical stirring not to be too intense. The use of mixing screws is to be avoided in general because they prevent most often the formation of the foam. The use of tubular reactors, which are segments of tubes provided or not with static mixers, is recommended. They will be advantageously designed so as to obtain a residence time therein of between 2 and 10 seconds. In each case, the mechanical stirring is adjusted so as to promote the foaming according to the invention. In some cases, it is preferable for the reagent causing the foaming to be added to the sludge upstream of its passage through a pump, which pump will cause the desired mechanical stirring. The use of static mixers may also be advantageous in order to obtain the optimum mechanical stirring intensity.

According to an advantageous embodiment of the invention, the process comprises phosphatization of the sludge, preferably before foaming. It was observed that the phosphatization of the sludge combined with its foaming makes it possible to obtain a waste in which toxic compounds present in the sludge are inerted and as a result, when the waste is stored, these toxic compounds do not contaminate the environment of the storage site. This embodiment is particularly advantageous when the treated sludge contains heavy metals. The expression heavy metals is understood to mean metals whose density is at least equal to 5 g/cm$^3$, as well as beryllium, arsenic, selenium and antimony, in accordance with the generally accepted definition (Heavy Metals in Wastewater and Sludge Treatment Processes; Vol I, CRC Press Inc; 1987; page 2). Lead is a particularly significant example thereof, given its harmful influence on the human body. In this embodiment, the inerted sludges may also contain aluminium metal. Preferably, the phosphatization is carried out by adding phosphoric acid to the sludge. In this case, the foaming and the inerting may be obtained concomitantly, in particular for sludges derived from the dredging of waterways and for sludges resulting from the addition of water to motor vehicle crushing residues. The quantity of phosphoric acid to be used depends on the precise composition of the sludge to be treated and in particular on the content of heavy metals. In practice, a quantity by weight of at least 1% (preferably 2%) relative to the weight of dry matter is to be used. It is preferable that the quantity of phosphoric acid is less than 15%. Quantities of between 2 and 6% are suitable in general.

According to an advantageous variant of the invention, the sludge is dried by techniques related to composting. In the remainder of the description, "dry sludge" denotes the product obtained from drying of the foam. This product is no longer necessarily in the foam state because the foam tends to densify during its drying. Composting is a well known technique for treating fermentable waste (capable of fermentation) such as green waste. It essentially consists in storing the waste for a long period in contact with air, at external ambient temperature, in order to allow the degradation of organic matter contained in the waste and the removal, by percolation, of the liquid which it contains. The use, according to this embodiment of the invention, of techniques related to composting for drying foamed sludge containing organic matter—even non fermentable—and heavy metals makes it possible to surprisingly reach high dry matter contents very. economically. The consumption of energy during the optional subsequent calcining of the sludge is thereby reduced. The drying of the foamed sludge by techniques related to composting even makes it possible to eliminate the calcining step when the degradation of the organic matter which is obtained is sufficient.

In the remainder of the description, the expression "drying" will always be understood to mean drying by techniques related to composting. During drying, the sludge is stored for a period sufficiently long for the water to be discharged spontaneously, under the action of gravity. A drying period greater than 24 hours is necessary. It is preferable for the drying to last at least 48 hours. Drying for more than one month appeared to be unnecessary. In practice, drying periods of between one and two weeks are suitable.

As exposed above, when, according to the invention, the sludge exists in the form of a foam, drying of the sludge is easier and more efficient. Indeed, the improved consistency of the sludge allows its mass handling by common construction site machines and makes it possible in particular to turn it over during composting. This makes it possible to more rapidly reach the desired dry matter contents.

According to a recommended variant of this embodiment, the drying is carried out under conditions such that after 12 days of drying, the dried sludge reaches a dry matter content exceeding 65%, preferably 70%.

The drying is carried out directly on the ground. However, in an advantageous embodiment of the process according to the invention, the foam is placed on a layer of sand.

According to a recommended variant of this embodiment, the sand layer is itself placed on a membrane impermeable to water in order to avoid contamination of the soil by the heavy metals and to allow recovery of the water resulting from the phosphated sludge during composting. Membranes made of plastic, for example polyethylene or PVC, are suitable.

The drying may be carried out in the open air, outside, without guarding against the action of rain and wide variations in temperature, provided that the latter remains above 0° C. It is nevertheless preferable to use a confined drying system such as composting tunnel. Such composting tunnels are well known in the field of the industrial treatment of organic waste capable of fermentation. The composting tunnel is advantageously equipped with systems for the circulation of air and with systems for the collection and treatment of the gases emitted, such as hydrogen sulphide. The hydrogen sulphide is preferably recovered and for example treated on a biofilter or reinjected during optional calcining. It is preferable that the composting tunnel comprises a sand layer placed on a membrane impermeable to water.

According to an advantageous embodiment of the invention, in particular when the sludge contains a lot of organic matter or when the latter is not sufficiently decomposed during drying, the dried sludge is calcined. The organic matter may be in the liquid state or in the solid state in the sludge. It may comprise for example apolar hydrocarbons, (mono- or polycyclic) aliphatic or aromatic hydrocarbons and halogenated solvents. The calcining is intended to destroy this organic matter. The calcining is generally carried out at a temperature greater than 450° C. so that the organic matter is sufficiently destroyed. It is advisable to avoid an excessive temperature, which would result in vaporizing some of the heavy metals. In practice, the calcining temperature is less than 1000° C. In a preferred variant of the process according to the invention, the calcining temperature is greater than 500° C. and less than 800° C. In order to destroy particularly well the organic matter and to volatilize as few heavy metals as possible, it is especially advantageous that the calcining temperature is between 550° C. and 750° C.

It is observed advantageously that the calcining is carried out in a controlled atmosphere.

To this effect, in a particular embodiment of the process according to the invention, this atmosphere is oxidizing. This variant facilitates the setting of the subsequent optional mortar, as described below. In this case, it is possible to use for example ambient air. Care should then be taken that sufficient air is available in the oven.

In another particular embodiment, the atmosphere is reducing. This embodiment is particularly advantageous in that it inhibits the formation of chromium VI.

The duration of the calcining depends on the composition of the sludge to be treated and the arrangement of the material in the calcining oven. It should also be sufficient to destroy the organic matter and, when the sludge has been phosphated, to produce enough pyrophosphate.

In a particular embodiment of the process according to the invention, the product derived from the calcining step is mixed with water and then subjected to setting and hardening. In this embodiment, a reducing additive is preferably incorporated into the mixing water. By way of example, this additive may be selected from iron, manganese, iron (II) compounds, manganese (II) compounds and reducing salts of alkaline metals. Sodium sulphite is preferred. The reducing agent is advantageously added in a quantity by weight of between 0.1 and 1% of the weight of dry matter contained in the sludge.

During the calcining step, some sludges, in particular those which are rich in calcite, give rise to the formation of pozzolanic materials. In this case, it is not necessary to add a hydraulic binder in order to cause setting and hardening.

When a hydraulic binder is necessary to bring about the setting and hardening, its precise composition is not very critical. It commonly consists of Portland cement. Pozzolanic materials such as ash from the burning of charcoal may also be suitable. It is necessary to add, during the mixing of the hydraulic binder with the calcining product intended to form a mortar, a quantity of mixing water sufficient to obtain a plastic paste. The quantity of hydraulic binder to be used depends on various parameters, in particular on the hydraulic binder selected, the composition of the sludge and the properties desired for the final product of the process of treatment according to the invention, in particular its mechanical strength. In practice, it is often recommended to use a quantity by weight of binder greater than 1% of the weight of the calcining ash. According to the invention, it is desirable that the weight of the hydraulic binder is less than 50% and preferably does not exceed 30%.

In an advantageous variant of the process according to the invention, a quantity by weight of hydraulic binder greater than 2% and less than 20% of the calcining product is used.

The shape of the solid mass obtained after the hardening, which may last for several days, is that into which the mortar is shaped. It may comprise for example briquettes or spherical or prismatic blocks. It is compact, substantially free of gaseous inclusions and thereby exhibits good mechanical properties, in particular a hardness and an impact strength which are sufficient to allow its handling and its storage without difficulties.

The solid and compact mass obtained after the hardening complies with the toxicity standards on lixiviates extracted in accordance with strict procedures such as those defined by the "TL" or "NEN" standards.

The French test for triple lixiviation "TL" is described in the French standard XPX 31-210. The protocol for the test consists in grinding the material so as to be able to pass it through a 4 mm sieve. This ground material is subjected to triple lixiviation with demineralized water, in a liquid/solid ratio equal to 10, with constant stirring. After each lixiviation, the heavy metal content of the washing liquid for the powder subjected to the test is measured.

The Dutch test "NEN" consists, for its part, in finely grinding the sample (under 125 μm) and adding water to it in a water: solid ratio of 50. It is then kept for three hours at pH 7, and then also for three hours at pH 4 (which is the minimum pH of rain water). The pH is continuously adjusted with the aid of a 1 N nitric acid solution (non-complexing acid). The heavy metal content of the liquid phase is then determined by analysis.

According to the American test TCLP (Toxicity Characteristic Leaching Procedure), 100 g of solid matter, passed through a 9.5 mm sieve, are taken and the sample is brought into contact for 18 hours with 2000 ml of solution containing 6 g/l $CH_3COOH$+2.57 g/l NaOH (pH 4.9). The material is then filtered on glass fibre at 0.6-0.8 μm.

The process according to the invention may be applied for example:

to sludge obtained from the settling of waste water of industrial or urban origin, to sludge obtained from the decontamination of soils such as those of certain industrial sites;

to sludge resulting from the addition of water to motor vehicle crushing residues or to incineration ash;

to sediments resulting from the dredging or cleaning of rivers, ponds, wells or sewers, and to sediments resulting from the cleaning of waterways (for example ports, lakes, rivers, channels).

The invention is especially suited to sludge consisting of sediments resulting from the cleaning of waterways.

FIG. 1 illustrates the comparative variation of the dry matter content of a sludge during storage at 25° C., according to whether or not it has been subjected to foaming according to the invention.

The examples, the description of which follows, show the importance of the invention.

EXAMPLE 1 (IN CONFORMITY WITH THE INVENTION)

In Example 1, samples of a sludge from the dredging of waterways were treated. The principal pollutant composition by weight of the sludge is presented in the following Table 1:

TABLE 1

| Constituents | Content by weight (weight of dry matter) |
|---|---|
| Cd | 9 mg/kg |
| Co | 40 mg/kg |
| Cr | 92 mg/kg |
| Cu | 88 mg/kg |
| Fe | 25200 mg/kg |
| Pb | 112 mg/kg |
| Zn | 428 mg/kg |
| Organics | 48 g/kg |
| Water | 417 g/kg |

The sludge has a density of 1.54 kg/dm$^3$. 5% (by weight of dry matter) of phosphoric acid at 85% was added to the sludge. The resulting mixture was introduced into a tubular reactor, at the outlet of which the mixture was in the form of a foam having a density of between 0.8 and 0.9. The foam was then placed in cylindrical containers having a diameter of 10 cm and a depth of about 1 cm. The containers were placed in an air stream having a temperature of 25° C. and a speed of 1.5 m/s, for 100 hours, during which period the samples were continuously weighed. The dry matter content values were deduced from the weighings. The results are presented in FIG. 1.

EXAMPLE 2 (NOT IN CONFORMITY WITH THE INVENTION)

In Example 2, the procedure was carried out as in Example 1 except that the sludge was not supplemented with phosphoric acid. The dry matter content values over time are presented in FIG. 1.

A comparison of the results of Examples 1 and 2 illustrates the effect of foaming according to the invention on the variation over time of the dry matter content of the sludges treated.

EXAMPLE 3 (IN CONFORMITY WITH THE INVENTION)

In Example 3, samples of a sludge collected from a site for spreading dredging sludge were treated. The principal pollutant composition by weight of the sludge is presented in the following Table 2:

TABLE 2

| Constituents | Content by weight (weight of dry matter) |
| --- | --- |
| Cd | 1.9 mg/kg |
| Co | 14 mg/kg |
| Table 1 Cr | 95 mg/kg |
| Cu | 100 mg/kg |
| Ni | 22 mg/kg |
| Pb | 78 mg/kg |
| Zn | 385 mg/kg |
| Organic matter | 31 g/kg |
| Water | 420 g/kg |

The sludge has a density of 1.67 kg/dm$^3$. 2.5% (by weight of dry matter content) of phosphoric acid was added to the sludge. The phosphated sludge was then pumped by means of a peristaltic pump and introduced into transparent columns having a height of 1220 mm and a diameter of 100 mm. The columns were obstructed at their lower base with a wire mesh having 1 mm openings, covered with a textile. The textile was itself covered with a layer of sand (thickness of about 1 cm). The density of the sludge, which was in the form of a foam, was then deduced from measurements of the height of the foam in the column and the weight thereof. A value of 1.4 kg/dm$^3$ was obtained. At this moment, the dry matter content was 50%. After 4 days of storage in the column, at a temperature of 30° C., the density increased up to 1.7 kg/dm$^3$ and the dry matter content was 52.9%.

At the end of the storage, the samples were subjected to the lixiviation test "TCLP" defined above. The results of the test are presented in Table 3 (in mg/l):

TABLE 3

| pH | Cd | Cu | Ni | Pb | Zn | PO4 |
| --- | --- | --- | --- | --- | --- | --- |
| 4.9 | <0.005 | <0.05 | <0.05 | <0.04 | 0.9 | 1010 |

EXAMPLE 4 (NOT IN CONFORMITY WITH THE INVENTION)

In Example 4, the procedure was carried out as in Example 3 except that the sludge was neither foamed nor phosphated. During its introduction into the columns, the sludge was not in foam form and its density was 1.67 kg/dM$^3$.

After drying, the sludge was subjected to the TCLP test. The results are presented in Table 4:

TABLE 4

| pH | Cd | Cu | Ni | Pb | Zn | PO4 |
| --- | --- | --- | --- | --- | --- | --- |
| 5.3 | 0.012 | 0.18 | <0.05 | 0.06 | 5.5 | <1 |

Comparison of Tables 3 and 4 illustrates the inerting of the heavy metals which is obtained.

EXAMPLE 5 (IN CONFORMITY WITH THE INVENTION)

In Example 5, the procedure was carried out as in Example 3, except that the sludge was supplemented with 7.2% of phosphoric acid at 85%. After its introduction into the columns, the density of the foam was 1.01 kg/dm$^3$, that is about 70% of the density of the sludge before phosphatization and its dry matter content 50%. After 6 days of storage in the columns, the density increased up to 1.4 kg/dm$^3$. At this moment, its dry matter content was 59.4%. The foam was then transferred into dishes and then reintroduced into the columns. After this handling which simulates the turning over of the sludge, the sludge was again stored for 6 days. At the end of the 6 days, the dry matter content was 71.2%.

The invention claimed is:

1. A process for the treatment of sludge comprising:
   concomitantly phosphatizing and foaming the sludge by adding phosphoric acid thereto and foaming under controlled conditions to form phosphated and foamed sludge;
   having a density of 50% to less than 90% of that of the sludge prior to treatment; and
   drying the phosphated and foamed sludge.

2. The process according to claim 1, wherein the density of the foam is less than 85% of that of the phosphated sludge.

3. The process according to claim 1, wherein the density of the foam is between 55 and 65% of that of the phosphated sludge.

4. The process according to claim 1, comprising a phosphatizing the sludge by adding thereto from at least 1% to less than 15% by weight phosphoric acid relative to the dry matter content of the sludge to form the phosphated sludge.

5. The process according to claim 1, wherein the foam is dried on the ground at ambient temperature.

6. The process according to claim 1, wherein said foam is dried for at least 12 days, and after 12 days of drying, the dried sludge reaches a dry matter content exceeding 65%.

7. The process according to claim 1, wherein the drying is carried out in a composting tunnel comprising a sand layer placed on a membrane impermeable to water.

8. The process according to claim 1, wherein the dried phosphated and foamed sludge is then calcined.

9. The process according to claim 8, wherein the calcining temperature is between 550 and 750° C.

10. The process according to claim 8, wherein a product is obtained from the calcining that is then mixed with water and is then subjected to setting and hardening.

11. The process according to claim 1, comprising phosphatizing the sludge by adding thereto from 2% to 6% by weight phosphoric acid relative to the dry matter content of the sludge.

12. The process according to claim 1, wherein the sludge has a dry matter content of less than 70% - more than 30%.

13. The process according to claim 1, wherein the sludge has a dry matter content of less than 70% - more than 40%.

14. The process according to claim 1, wherein the foam is dried at ambient temperature for from 2 to 7 days.

15. The process according to claim 1, wherein the foam is dried at ambient temperature for from 4 to 6 days.

* * * * *